Jan. 6, 1931.   O. L. BARNEBEY   1,787,714
APPARATUS FOR SEPARATING AND RECOVERING GASES
Original Filed July 20, 1920   2 Sheets-Sheet 1

INVENTOR:
Oscar L. Barnebey

Jan. 6, 1931. O. L. BARNEBEY 1,787,714
APPARATUS FOR SEPARATING AND RECOVERING GASES
Original Filed July 20, 1920  2 Sheets-Sheet 2

INVENTOR:
Oscar L. Barnebey

Patented Jan. 6, 1931

1,787,714

UNITED STATES PATENT OFFICE

OSCAR L. BARNEBEY, OF COLUMBUS, OHIO, ASSIGNOR TO AMERICAN SOLVENT RECOVERY CORPORATION, A CORPORATION OF OHIO

APPARATUS FOR SEPARATING AND RECOVERING GASES

Original application filed July 20, 1920, Serial No. 397,745. Divided and this application filed July 29, 1922. Serial No. 578,331. Renewed November 3, 1928.

My invention relates to an improved apparatus for separating gases and vapors. In my copending application, Serial Number 397,745, filed July 20, 1920, (United States Letters Patent No. 1,680,840), and from which this application has been divided, I have described and claimed a process for separating and recovering gases. Also in another divisional application, Serial Number 578,332 (United States Letters Patent No. 1,502,897), I have described and claimed an apparatus for separating and recovering gases especially applicable to high pressures and which contain certain features for adsorbing and generating gases and vapors under high pressure. This application deals with apparatus more particularly suitable for separating and recovering gases under relatively low pressures, that is, substantially atmospheric pressure.

In following this invention the process described in application Serial Number 397,745 is followed in that the gaseous mixture to be treated is passed through the adsorbing material, preferably highly activated carbonaceous material, which removes one or more of the constituents of the gaseous mixture by the force of adsorption thus separating such constituents from the unadsorbed constituent or constituents after which the adsorbed gas or gases are generated from the adsorbing material by means of heat, steam distillation or some such similar step hereinafter described.

My invention makes possible a very effective separation of adsorbable from unadsorbable constituents of gaseous mixtures. The separation is effected in an economic manner. My apparatus is so designed as to allow the handling of very large volumes of gases without compression and to effect the separation from such gases in an economic manner.

The large capacity for efficient separation is made possible by my special means of handling the gases. A unitary or sectional system is used to provide ease of shipment, rapidity of assembly and elasticity of capacity which has a special advantage when it is found necessary to enlarge the capacity of any particular unit which is in operation as new sections can be added if required, thus enlarging the capacity of the equipment any time desired.

By vertical assembly in horizontal layers a minimum of floor space is required for handling large quantities of gases at normal pressures. The apparatus is economic in first cost and operation. Special means are provided for regulating and controlling the resistance or pressure caused by passage of gases in contact with the adsorbing material.

Other objects achieved in my invention auxiliary to the foregoing will appear in the following description:

When gases or vapors are passed through an adsorptive material such as activated charcoal such gases and vapors are adsorbed to more or less extent, some being adsorbed completely or to a very large degree and others scarcely at all. The amount of an adsorbable gas or vapor removed from a gaseous mixture depends upon several factors; first, the amount of contacting surface of adsorbing material; second, the velocity of the gas passing through the adsorbing material; third, the concentration of adsorbable gas in the gaseous mixture; fourth, the temperature of the gaseous mixture; fifth, the temperature of the adsorbing material; and sixth, the pressure under which the adsorption is taking place.

In my copending application apparatus has been described in which high pressures are used for separation of gases and vapors. In this application normal pressures are used so that the factors to be involved will regulate the time of contacting gases with adsorbing material in such a manner as to give maximum opportunity of the adsorbable gas to be taken up by adsorbing material accomplishing this at as low a velocity as possible and also reducing the temperature of the adsorbing material to as low a point as is economically reasonable. These points are accomplished by providing very large surface areas of adsorbing medium and cooling means to maintain as low a temperature as is desired. Likewise, heating means are provided to heat the adsorbing material and adsorbed gas to remove the adsorbed gases and generate the same.

When the velocity of gases to be handled is low and does not require free movement of the gases, such gases are passed directly through the adsorbing medium. When, however, the velocity of movement is great in handling large quantities of gas and the conditions require the use of a relatively small adsorbing apparatus, then the gases are passed over layers of adsorbing material and allowed to diffuse through. Special valvular means are provided to accomplish this diffusion of gases.

Again the gas mixture can be partially forced through the layers of adsorbing material and partially passed over the surface of the adsorbent and diffused through. When the concentration of the gas or vapor to be separated is low and large volumes of gaseous mixture must be handled per unit of time and a big back pressure tends to build up due to resistance to direct passage of the large volume of gases through the layers of adsorbent, then I prefer to provide a free path for the flow of gaseous mixture from one interlayer space to another so that the mixture can readily flow over and between the layers of adsorbing material and have opportunity to diffuse or penetrate into the adsorbing layers and be adsorbed by the adsorbing material.

A relatively large number of layers are spaced as close together as is feasible. Also the gases are directed in such a manner as to give a stirring effect as the gaseous mixture passes from one layer of adsorbing material to the next. If the temperature of the gases to be treated is too high, such gases are cooled before they enter the adsorption apparatus, such cooling lessening the cooling load which otherwise would be placed upon the cooling means embedded within the adsorbent material layers during the adsorbing period.

When some difficulty is experienced in removing the adsorbed gases or vapors during the generating period due to the lack of sufficient heating within the heating coils or the requirement of water vapor to affect steam distillation, then steam or superheated steam is injected directly into the material thus adding more heat for distillation and giving the special effect or steam distillation when such is desired. The apparatus is operated periodically in that each unit of the apparatus is first saturated with adsorbable gases or vapors by passing the gaseous mixtures through the same until such is accomplished.

After saturation the material is heated or steam distilled while heating and the gases previously adsorbed thus removed. The liberated gases are condensed with any good form of condenser. When steam is used in direct contact with the material the condensed steam must be separated from the liquefied gas or vapor recovered.

A period of adsorption plus a period of generation is called a cycle. These cycles may be repeated continually. In order to have continuous operation in response to both adsorption and generation two or more units are used so that adsorption can be taking place with one or more units and generation likewise be occurring at the same time with one or more units.

I will now describe my apparatus in detail referring to the accompanying drawings.

Figures 4, 5 and 6 are enlarged fragmentary vertical sections showing alternative methods of joining sections of the tower together.

Figure 1:
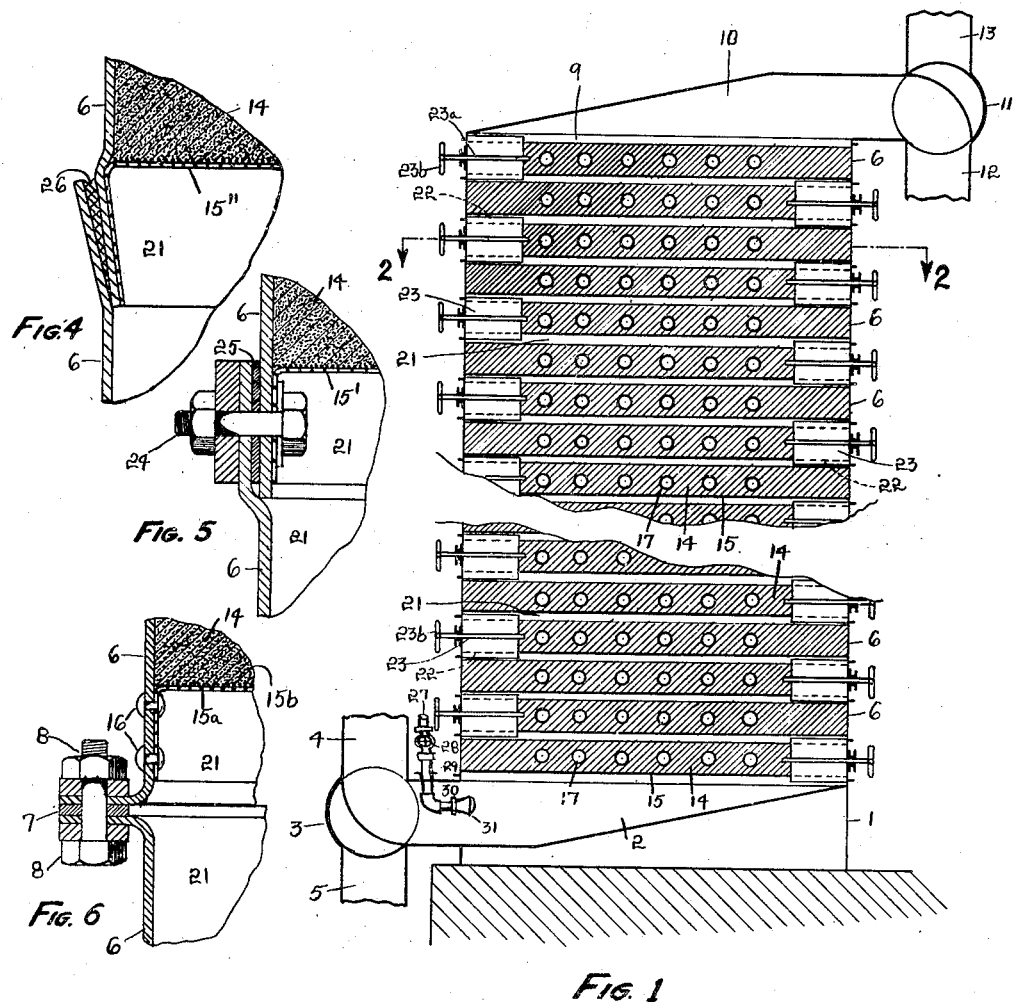
Figure 1 is a central vertical section of an adsorption tower embodying my improvements, the showing being in a measure diagrammatic to give clearness on a drawing of this size.

Referring to the drawings the tower comprises a container preferably made of sheet steel and formed by a series of superposed sections or units. 1 is a base section having an inlet conduit 2 for gas or vapor, said conduit connecting through the casing of valve 3 with a branch 4 adapted to supply the gas mixture to be separated and with a branch 5 adapted to supply hot air or steam.

Mounted on the base section 1 are a series of superposed units or sections 6 which are alike and are joined to each other by gas tight joints such for example as that shown in Figure 6. As there indicated, the top and bottom edges of each units are flanged outward to receive a suitable interposed packing 7 and to be tightly clamped together by bolts 8.

On the uppermost one of the units 6 is mounted a top section 9 which constitutes the upper end of the container and is formed with an outlet conduit 10 that connects through the casing of the two way valve 11 with a branch 12 for the discharge of the unadsorbed gases and with a branch 13 for the discharge of the adsorbed gases.

Each of the similar units 6 has one or more layers 14 of adsorbing material. Any suitable adsorbent may be used but I prefer to use a highly activated carbon. To support the layers of adsorbent each of the units 6 is provided with a transverse diaphragm for each layer carried by the unit. In the preferred form of construction each unit carries a single layer of adsorbent and the unit thus has in its lower part a single diaphragm 15 preferably consisting of a base sheet 15a of expanded or perforated metal and an overlying sheet 15b of relatively fine screen. This screen may be made of tinned or nickeled iron, Monel metal or any other form of non-corrodible metal. The expanded metal with its coarse mesh affords the necessary strength to support the layer while the relatively fine screen prevents the granular material from falling through. Where the units 6 are joined as indicated in Figure 6 the supporting diaphragm 15 may be secured to the units by rivets 16 as shown in said figure.

Figure 2:
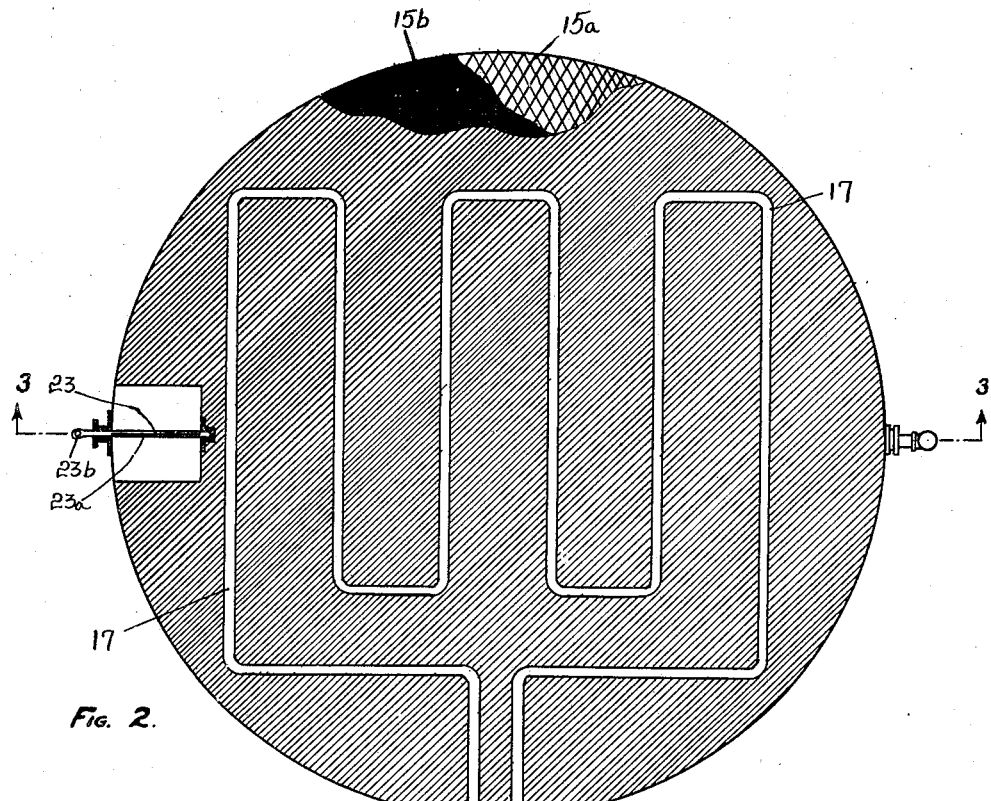
Figure 2 is an enlarged transverse section on the line 2—2 of Figure 1, some of the parts being broken away to disclose the construction.
Figure 3:
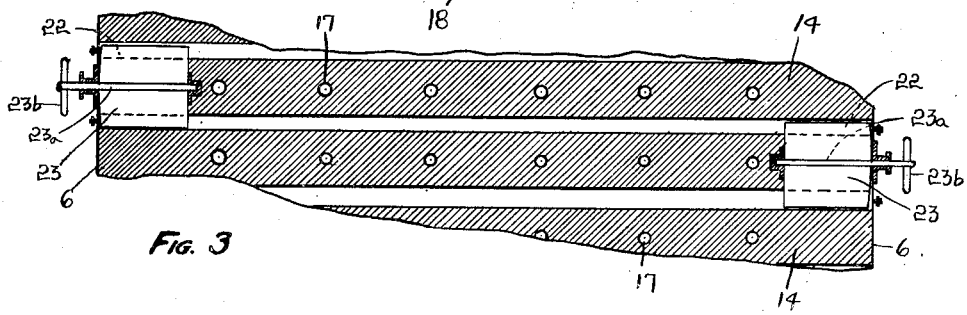
Figure 3 is a fragmentary vertical section on the line 3—3, of Figure 2.

In each layer of adsorbent is embedded a circuitous pipe or coil 17 which, as indicated in Figure 2, has one end connected to a supply manifold 18 and its other end to a manifold 19. The supply manifold 18 may be connected with a source of cold water or the like which can be passed through the pipe 17 to cool the adsorbent, or can be connected with a steam supply for the purpose of heating the adsorbent. The discharge manifold 19 is preferably provided at its lower end with a steam trap.

Provision is also made to introduce steam or superheated steam at 27 this pipe 29 extending through stuffing box 30 and out of injector 31 into base conduit 2. This pipe connection also can be used to inject cooling water to lower the temperature of the gaseous mixture previous to separation of the adsorbable constituents in such gases that are unaffected by moisture.

The positions of the supporting diaphragms 15 and the thickness of the layers of adsorbent are determined so that in the assembled tower the layers 14 are separated from each other by free spaces 21. In the apparatus illustrated in my earlier application, Serial No. 348,901, mentioned in my copending application Serial Number 397,745, above referred to, the adsorbent is in a single continuous mass. I find that in such a construction channels tend to be formed in the adsorbent, thus permitting an uneven passage of the gas mixture with resultant loss of efficiency. This I effectively prevent by my present invention since the gas, passing through one relatively thin layer of adsorbent enters one of the spaces 21 in which it can freely diffuse and mix before entering the next layer of the series.

In carrying out my present invention the gas may all be forced to pass through the layers of adsorbent, except of course that which is adsorbed, and in some cases, especially where the gas is under considerable pressure, I prefer to follow that practise, but where more moderate pressures are employed I prefer to provide connecting passages between the interlayer spaces 21. These passages can be formed or provided in any manner but are preferably disposed in staggered relation so that gas passing through the passage is caused to move over first one side of a layer and then its other side. In the construction shown I have formed passages 22 in the adsorbent layers themselves, and I have provided each passage 22 with a swinging leaf valve 23 so that the passage can be left entirely open or partially or entirely closed. As shown each valve has a spindle 23a which is fitted with a handle 23b for manual operation. The shaft preferably fits its bearings snugly enough to hold the valve in any adjusted position.

In Figure 5 I have indicated a second form of joint for securing the tower units together. In this construction a series of horizontally disposed bolts 24 serve to clamp the adjacent walls of the sections together with an interposed packing 25 and also serve to secure the diaphragm 15' in position.

In Figure 4 still another form of joint is shown in which the adjacent edges of the units are bent as indicated so as to support the diaphragm 15'' and receive a packing 26 which is preferably calked to insure tightness. This packing may be made of suitable fibrous material impregnated with graphite or may be made of soft metal poured into the joint in a molten state.

In the operation of the apparatus above described the gas or vapor mixture to be separated is caused to enter through the branch 4 and the main conduit 2 and pass through and over the adsorbent material 14, the adsorbable gases and vapors being taken up by the adsorbent while the unadsorbable constituents find their way to the outlet conduit 10 and the passage 12. At the beginning of the operation control valves 23 are closed in some of the upper sections, usually about five of them. This causes all the gases not adsorbed to pass directly through the adsorbent layers 10 in these upper sections. The other control valves are preferably left open until the upper sections are thoroughly saturated with adsorbable gases and vapors. While this saturation is proceeding the other layers are wholly or partially saturated due to the diffusion of the gases into the granular material. After the upper sections are saturated the control valves of several of the next lower sections are closed and the valves of the upper saturated sections opened. This gradual closing of the valves from the top of the tower downward is continued until the maximum amount of adsorbable gas or vapor has been taken up by each section. When desired water can be injected through means 27—31 inclusive to cool the gaseous mixture as it enters the base of the tower.

If the heat of adsorption is considerable cold water is passed through the cooling coils 17 continuously during adsorption to maintain the temperature of the adsorbent and the gas as low as possible during the adsorption period.

When the adsorption is complete the valve 3 is moved to cut off the supply of gas mixture to the tower and, preferably, the mixture is then conducted into another tower of the same character.

At the same time the valve 11 is moved to connect the conduit 10 with the discharge branch 13 and the adsorbent material is heated to distil off the adsorbed gas which is conducted out through the branch 13, the gas being condensed and collected by means of a suitable condenser. The adsorbent material is heated by passing hot water or steam through the pipes 17 or by admitting hot air or steam through the conduit 5 into the interior of the tower in direct contact with the adsorbent material, or both means of heating may be employed in conjunction. If the liquid resulting from the condensation of the adsorbed gas is miscible with water then the direct application of steam to the adsorbent material must be dispensed with or, if it is not dispensed with, the resultant mixture of condensed gases and water must be redistilled or otherwise separated. In general it has been found that the direct application of steam to the adsorbent should be avoided in such cases whenever possible and the adsorbed gases or vapors removed by heat applied through the pipes 17. Of course if the condensed gas liquid is immiscible with water, the immiscible layers are readily separated by drawing one off from the other.

When the generation and collection of the previously adsorbed gases or vapors are completed cool water is turned into the coils 17 and the gas valves are again changed to admit the gas mixture and begin a repetition of the above described cycle. Thus the cycle of operations may be repeated indefinitely. Usually the operation of several adsorbing towers in conjunction is advisable so that the operation may be continuous, adsorption going on in one tower while generation of adsorbed gas is proceeding in another tower. The process may be operated under any pressure desired by proper regulation of the exit valve of the tower and of the pressure of the gas supplied thereto, but it will be understood that the construction of the tower must be made heavy and strong enough to withstand the pressure used. It is also to be observed in this connection that when working under high pressure there is a special tendency, because of the pressure, for the formation of condensate in the tower, and under such circumstances it is desirable to have means for the removal of such condensate such as the valve-controlled discharge conduit which constitutes a part of the invention covered in my aforesaid application, Serial No. 578,332 (Patent No. 1,502,897). It will be observed that both the local pressure and distribution of the gas in the tower can be regulated by the adjustment of the valves 23.

The details of the apparatus can be varied or modified by those skilled in the art and keep within the scope of my invention. For example, various forms of heating coils and cooling means can be used. Instead of injecting water into the base for cooling a separate cooling system may be attached to accomplish the same purpose. In certain cases partial vacuum can be used to remove the gases during generation and condensation of the same. Various composition of materials of construction can be used. The invention is broad in character, the limitations being those of the following claims.

I claim:

1. In apparatus for separating the constituents of gases by adsorption, the combination of a container having inlet and outlet passages for gas, a plurality of separated layers of adsorbing material interposed in series between the inlet passage for the gaseous mixtures and the outlet passage for unadsorbed gas with interposed spaces adapted to permit through diffusion of the gases therein, and means embedded in said layers for varying the temperature of the adsorbing material.

2. In apparatus for separating the constituents of gases by adsorption, the combination of a container having inlet and outlet passages for gas, a plurality of separated layers of adsorbing material interposed in series between the inlet passage for the gaseous mixture and the outlet passage for unadsorbed gas with interposed spaces adapted to permit thorough diffusion of the gases therein, and means for introducing steam directly to the adsorbing material.

3. In apparatus for separating the constituents of gases by adsorption, the combination of a container having inlet and outlet passages for gas, a plurality of separated layers of adsorbing material interposed in series between the inlet passage for the gaseous mixture and the outlet passage for unadsorbed gas with interposed spaces adapted to permit thorough diffusion of the gases therein, and means in said layers for controlling the temperature of the adsorbing material comprising embedded coils adapted to receive heating or cooling fluids.

4. In apparatus for separating the constituents of gases by adsorption, the combination of a container having inlet and outlet passages for gas, a plurality of separated layers of adsorbing material interposed in series between the inlet passage for the gaseous mixture and the outlet passage for unadsorbed gas, means for controlling the temperature of the adsorbing material comprising embedded coils adapted to receive heating and cooling fluids, and means for adding steam directly to the adsorbing material.

5. In apparatus for separating the constituents of gases by adsorption, the combination of a container having inlet and outlet passages for gas, a plurality of separated layers of adsorbing material interposed in series between the inlet passage for the gaseous mixture and the outlet passage for unadsorbed gas, the spaces between the said layers being connected by passages whereby some gas can pass from one such space to another without passing through the adsorbing material, and means in said layers for cooling and heating the adsorbent material.

6. In apparatus for separating the constituents of gases by adsorption, the combination of a container having inlet and outlet passages for gas, a plurality of separated layers of adsorbing material interposed in series between the inlet passage for the gaseous mixture and the outlet passage for unadsorbed gas, the spaces between the said layers being connected by passages whereby some gas can pass from one such space to another without passing through the adsorbing material, and means for controlling the distribution of gas to the spaces between said layers.

7. In apparatus for separating the constituents of gases by adsorption, the combination of a container having inlet and outlet passages for gas, and a plurality of separated layers of adsorbing material interposed in series between the inlet passage for the gaseous mixture and the outlet passage for unadsorbed gas, one or more of said layers being provided with a valved passage therethrough to permit a more or less free passage of gas according to the adjustment of the valve or valves.

8. In apparatus for separating the constituents of gases by adsorption, the combination of a container having inlet and outlet passages for gas, a plurality of separated layers of adsorbing material interposed in series between the inlet passage for the gaseous mixture and the outlet passage for unadsorbed gas, said layers being formed with passages therethrough and the passages of each layer being staggered in relation to those of the adjacent layers, and means for controlling the temperature of the adsorbing material.

9. In apparatus for separating the constituents of gases by adsorption, the combination of a sectional container comprising end sections formed with gas passages having valve devices for controlling the entrance and exit of gases and the rate of flow thereof and a plurality of intermediate uniform sections secured together and to the end sections, and a plurality of separated layers of adsorbing material interposed in series between the end sections of the container, each layer being entirely supported on one of the said intermediate sections.

10. In apparatus for separating the constituents of gases by adsorption, the combination of a sectional container comprising end sections formed with gas passages having valve devices for controlling the entrance and exit of gases and the rate of flow thereof and a plurality of intermediate uniform sections secured together and to the end sections, and a layer of adsorbing material supported in each of said uniform sections.

11. In apparatus for separating the constituents of gases by adsorption, the combination of a sectional container comprising end sections formed with gas passages having valve devices for controlling the entrance and exit of gases and the rate of flow thereof and a plurality of intermediate uniform sections secured together and to the end sections, and a layer of adsorbing material supported in each of said uniform sections, with an intervening space between it and the layers of the next adjacent sections.

12. In apparatus for separating the constituents of gases by adsorption, the combination of a sectional container comprising end sections formed with gas passages possessing valvular means for controlling the entrance and exit of gases and rate of flow of gas, a plurality of intermediate sections secured together and to the end sections, a plurality of layers of adsorbing material interposed between the end sections of the container, each layer being entirely supported on one of the said intermediate sections, each layer of adsorbing material being supported by a foraminous transverse diaphragm comprising two members one of which is superposed on the other and has openings smaller than the particles of adsorbent material while the lower member has relatively large openings.

13. In apparatus for separating the constituents of gases by adsorption, the combination of a sectional container comprising end sections formed with gas passages possessing valvular means for controlling the entrance and exit of gases and rate of flow of gases, a plurality of intermediate sections secured together and to the end sections, a plurality of layers of adsorbing material interposed between the end sections of the container, and means for supporting each of said layers entirely from one of said intermediate sections comprising a member containing openings smaller than the particles of the adsorbent material and means for rigidly supporting said member.

In testimony whereof, I hereunto affix my signature.

OSCAR L. BARNEBEY.